Patented Jan. 21, 1936

2,028,271

UNITED STATES PATENT OFFICE 2,028,271

MANUFACTURE OF PARA-CYCLOHEXYL-PHENOLS

Karl Brodersen and Hermann Behncke, Dessau in Anhalt, and Ernst Korten, Frankfort-on-the-Main-Fechenheim, Germany, assignors to General Aniline Works, Inc., New York, N. Y., a corporation of Delaware No Drawing. Application December 15, 1933, Serial No. 702,648. In Germany December 20, 1932

2 Claims. (Cl. 260—154)

Our present invention relates to a new process of manufacturing para-cyclohexylphenols and more particularly to such a process in which a para-cyclohexylbenzenesulfonic acid is treated in the heat with a caustic alkali.

It has already been proposed to make cyclohexylphenol by condensing cyclohexanol with phenol catalytically or by means of strong acids, such as sulfuric acid, toluenesulfonic acid, phosphoric acid or its anhydride, but these methods are not practicable since undesired secondary products, which can be separated only with difficulty, such as cyclohexylphenyl ether, cyclohexylphenylcyclohexyl ether or the like, are formed in too large a yield. Furthermore, it is not possible to influence the content of ortho-cyclohexylphenol according to requirements.

Now we have found that para-cyclohexylphenols are obtainable on a technical scale by using para-cyclohexylbenzenesulfonic acid as starting material and by treating it with caustic alkalies under certain conditions described hereafter.

The cyclohexylbenzenesulfonic acid, from which cyclohexylphenol can smoothly be obtained, is made by a prolonged treatment of the cyclohexylbenzene with a sulfonating agent until a sulfonic acid which is stable to boiling in dilute acid, has been produced. According to the conditions of operation, there is obtained a para-sulfonic acid with a varying content of ortho-sulfonic acid.

Kursanoff (Annalen der Chemie, vol. 318, page 318/19) ascertained during his researches on phenylcyclohexane and some of its derivatives that the cyclohexylbenzenesulfonic acid produced by sulfonating cyclohexylbenzene is very unstable and parts with a portion of its sulfonic acid group with formation of disulfonic acid even when an aqueous solution of an alkali salt of it is heated. The use of this sulfonic acid, therefore, for producing other cyclohexylbenzene derivatives, such as cyclohexylphenol, has not been practicable.

When introducing para-cyclohexylbenzenesulfonic acid in the usual manner into molten alkalies, no formation of the corresponding phenol can be observed. The sulfonic acid salt remains unmolten on the surface of the alkali melt and even by stirring no double decomposition occurs, since the sulfonic acid salt is not wetted by the alkali. Under these conditions, finally the para-cyclohexylbenzene sulfonic acid is completely decomposed under formation of carbon.

In order to convert the sulfonic acid into the corresponding phenol by means of alkali fusion, care is to be taken that the reaction components are homogenized as far as possible. This may be done either by carrying out the double decomposition in the presence of water under high pressure in a closed vessel or preferably in a ball mill heated to the reaction temperature.

The following examples illustrate the invention without limiting it, the parts being by weight:—

*Example 1.*—320 parts of cyclohexylbenzene are added gradually at about 70° C. and while stirring to 400 parts of fuming sulfuric acid (20 per cent. of free $SO_3$) and the whole is stirred at this temperature until a sample dissolved in water shows complete stability on boiling the water. The working up of the sulfonation mixture to the sodium salt is conducted in the usual manner. There are obtained 525 parts of the dry sodium salt of nearly pure para-sulfonic acid with a content of 95 to 97 per cent. (corresponding with 95 to 97 per cent. of the theory).

525 parts of sodium para-cyclohexylbenzene sulfonate, made as described, are heated with 600 parts of sodium hydroxide solution of 50 per cent. strength in the baking drum (a revolving ball mill) at about 290° to about 300° C. until no more water is evolved. The reaction mixture thus forms a pasty mass in which the para-cyclohexylphenol formation occurs very smoothly and without formation of carbon. The reaction mixture is then worked up as usual by dissolving it in water, filtration and acidifying. It may be purified by redissolving it in dilute alkali and reprecipitation. About 260 parts of pure para-cyclohexylphenol of melting point 127 to 128° C. are thus obtainable.

*Example 2.*—278 parts of the potassium salt of the cyclohexylbenzenesulfonic acid, made as described in Example 1, are heated for 4 hours at about 290° C. with 275 parts of potassium hydroxide solution of 50 per cent. strength and 300 parts of water in a closed vessel. After the mass has been worked up, there are obtained about 135 parts of crude cyclohexylphenol (=75 per cent. of the theory).

Under these working conditions a raised pressure up to about 70 atmospheres and higher is generated in the vessel. On this account we prefer to carry out the invention in the rotating ball mill as indicated in Example 1.

It is obvious that our invention is not limited to the foregoing examples or to the specific details given therein. Thus, for instance, a somewhat more concentrated or more diluted caustic alkali solution may be used, if care is taken that the reaction conditions are thus chosen that an intimate contact of the reaction components is gained. Furthermore, substitution products of para-cyclohexylbenzene sulfonic acids, such as the homologues, may be subjected to the treatment as described. The temperature of the reacting mixture preferably is kept at about 290 to about 300° C.; it may, however, slightly be variated without departing from the present invention as claimed in the claims following hereafter.

What we claim is:—

1. The process for manufacturing para-cyclohexylphenols which comprises heating to a temperature of about 290 to about 300° C. a pasty, homogeneous mass consisting of a sodium hydroxide solution of 50 per cent. strength and sodium para-cyclohexylbenzene sulfonate.

2. The process for manufacturing para-cyclohexylphenols which comprises heating together para-cyclohexylbenzenesulfonic acids and a caustic alkali in the presence of water at superatmospheric pressure.

KARL BRODERSEN.
HERMANN BEHNCKE.
ERNST KORTEN.